United States Patent
Steed

(10) Patent No.: US 10,947,021 B2
(45) Date of Patent: Mar. 16, 2021

(54) PACKAGING FOR POWDERED EXPLOSIVE-DETECTION TRAINING AIDS AND USES THEREOF

(71) Applicant: The Government of the United States of America, as represented by the Secretary of Homeland Security, Washington, DC (US)

(72) Inventor: Darren Jay Steed, Egg Harbor Township, NJ (US)

(73) Assignee: The Government of the United States of America, as represented by the Secretary of Homeland Security, Washington, DC (US)

( * ) Notice: Subject to any disclaimer, the term of this patent is extended or adjusted under 35 U.S.C. 154(b) by 20 days.

(21) Appl. No.: 16/279,121

(22) Filed: Feb. 19, 2019

(65) Prior Publication Data
US 2020/0262629 A1 Aug. 20, 2020

(51) Int. Cl.
| | |
|---|---|
| *B65D 75/30* | (2006.01) |
| *A01K 15/02* | (2006.01) |
| *B65D 85/00* | (2006.01) |
| *F41H 11/132* | (2011.01) |
| *F42B 8/00* | (2006.01) |
| *B65D 33/01* | (2006.01) |

(52) U.S. Cl.
CPC .............. *B65D 75/30* (2013.01); *A01K 15/02* (2013.01); *B65D 85/70* (2013.01); *F41H 11/132* (2013.01); *F42B 8/00* (2013.01); *B65D 33/01* (2013.01); *B65D 2565/388* (2013.01)

(58) Field of Classification Search
CPC .. B65D 75/30; B65D 33/01; B65D 2565/388; B65D 51/30; B65D 81/264; B65D 81/268; A01K 15/02; F41H 11/132; F42B 8/00
USPC ........ 206/204, 363, 438, 494, 528; 383/100, 383/102, 103
See application file for complete search history.

(56) References Cited

U.S. PATENT DOCUMENTS

| | | | | |
|---|---|---|---|---|
| 4,417,658 | A * | 11/1983 | Gardner | A61L 2/26 206/438 |
| 5,203,458 | A * | 4/1993 | Cornwell | B65D 33/01 206/278 |
| 5,720,391 | A * | 2/1998 | Dohm | A61F 2/0095 206/363 |
| 2005/0092636 | A1 * | 5/2005 | Su-Syin | B65B 55/18 206/363 |

(Continued)

*Primary Examiner* — Luan K Bui
(74) *Attorney, Agent, or Firm* — Lavanya Ratnam; Kelly G. Hyndman

(57) ABSTRACT

The present application is directed to a packaging for a powdered explosive-detection training aid which may include first and second opposing flexible sheets heat sealed together along less than a periphery thereof and defining a storage compartment therebetween, wherein an unsealed portion of the periphery defines an opening to the storage compartment, wherein at least a portion of the first opposing flexible sheet is a semipermeable material permeable to a vapor emitted from the powdered explosive-detection training aid, with the second opposing flexible sheet being impermeable to the powdered explosive-detection training aid vapor; and a sealing member, wherein the sealing member is secured to the first opposing flexible sheet and, in a closing position, covers the semipermeable portion of the first opposing flexible sheet.

13 Claims, 10 Drawing Sheets

(56) References Cited

U.S. PATENT DOCUMENTS

| | | | |
|---|---|---|---|
| 2011/0192888 A1* | 8/2011 | Tai | B65D 75/30 |
| | | | 229/80 |
| 2012/0205269 A1* | 8/2012 | Ludvig | A61B 50/30 |
| | | | 206/363 |
| 2014/0079589 A1* | 3/2014 | Landgrebe | A61L 2/26 |
| | | | 422/28 |
| 2017/0283136 A1* | 10/2017 | Branyon | B32B 3/266 |

\* cited by examiner

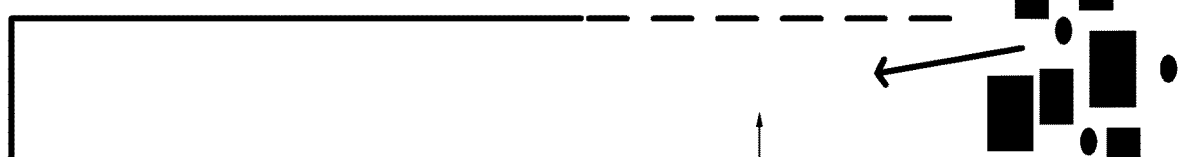
FIG. 5A
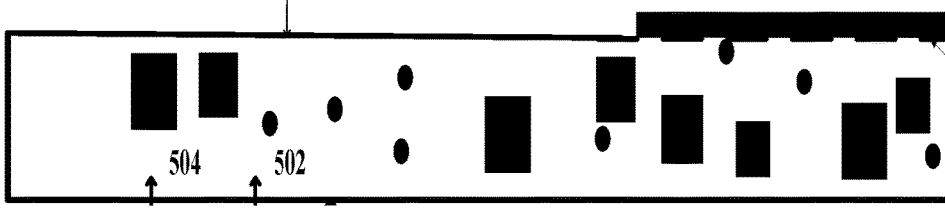
FIG. 5B
FIG. 5C

PACKAGING FOR POWDERED EXPLOSIVE-DETECTION TRAINING AIDS AND USES THEREOF

BACKGROUND

The "background" description provided herein is for the purpose of generally presenting the context of the disclosure. Work of the presently named inventors, to the extent it is described in this background section, as well as aspects of the description, which may not otherwise qualify as prior art at the time of filing, are neither expressly nor impliedly admitted as prior art against the present disclosure.

Scent-detecting animals, such as canines, are routinely trained to detect explosives using samples of genuine explosives or pseudo-explosive training aids. Such substances are typically placed into a packaging, and then a canine, for example, is conditioned to respond to the vapor plumes emanating from the packaging. However, a scent-detecting animal may readily be exposed to unintentional explosive odors due to cross-contamination of the training area, thus skewing results and confusing both animals and handlers. Avoiding contamination of areas used to train animals to detect explosives and pseudo-explosives is consequently desirable.

SUMMARY

The present inventor recognized that the packaging commonly used to contain explosives and pseudo-explosives during explosive-detection training of an animal is often so porous that explosive particulate matter and dust filter through the packaging and contaminate areas used for training. Hence, the present inventor developed a packaging that is capable of containing explosive particulate matter, but is permeable to explosive vapors. Moreover, the present packaging is resistant to liquid water, thus allowing the packaging to be readily used with hydrophilic explosives. Further, the puncture-resistant properties of the present packaging allow it to be conveniently used to train, e.g. canines, to detect explosives. Accordingly, the packaging of the present disclosure can be used to contain a wide variety of powdered explosive-detection training aids and allow, e.g., a canine, to detect the vapors from explosive materials without contaminating training areas with explosive particulates.

In one aspect, the present application is directed to a packaging for a powdered explosive-detection training aid including: first and second opposing flexible sheets, wherein the first and second opposing flexible sheets are heat sealed together along less than a periphery thereof and define a storage compartment therebetween, wherein an unsealed portion of the periphery defines an opening to the storage compartment, wherein a melting point of the first opposing flexible sheet is substantially the same as a melting point of the second opposing flexible sheet, wherein at least a portion of the first opposing flexible sheet is a semipermeable material, wherein the semipermeable material is permeable to a vapor emitted from the powdered explosive-detection training aid, and wherein the semipermeable material is impermeable to liquid water and particulate matter from the powdered explosive-detection training aid, wherein the second opposing flexible sheet is impermeable to the powdered explosive-detection training aid vapor; and a sealing member, wherein the sealing member is secured to the first opposing flexible sheet and, in a closing position, covers the semipermeable portion of the first opposing flexible sheet.

In another aspect, the present disclosure is directed to a packaged powdered explosive-detection training aid including: first and second opposing flexible sheets with a powdered explosive-detection training aid therebetween, the opposing flexible sheets being heat sealed along a periphery thereof, wherein a melting point of the first opposing flexible sheet is substantially the same as a melting point of the second opposing flexible sheet, wherein at least a portion of the first opposing flexible sheet is a semipermeable material, wherein the semipermeable material is permeable to a vapor emitted from the powdered explosive-detection training aid, wherein the semipermeable material is impermeable to liquid water and particulate matter from the powdered explosive-detection training aid, wherein the second opposing flexible sheet is impermeable to the powdered explosive-detection training aid vapor, and a sealing member, wherein the sealing member is secured to the first opposing flexible sheet and, in a closing position, covers the semipermeable portion of the first opposing flexible sheet.

The present disclosure is also directed to a method of training a mammal to detect a powdered explosive-detection training aid, which method includes: placing a packaged powdered explosive-detection training aid in a training area, wherein the packaged training aid comprises: first and second opposing flexible sheets with the powdered explosive-detection training aid therebetween, the opposing flexible sheets being heat sealed along a periphery thereof, wherein a melting point of the first opposing flexible sheet is substantially the same as a melting point of the second opposing flexible sheet, wherein at least a portion of the first opposing flexible sheet is a semipermeable material, wherein the semipermeable material is permeable to a vapor emitted from the powdered explosive-detection training aid, wherein the semipermeable material is impermeable to liquid water and particulate matter from the powdered explosive-detection training aid, wherein the second opposing flexible sheet is impermeable to the powdered explosive-detection training aid vapor; conditioning the mammal to detect the vapors permeating from the packaged powdered explosive-detection training aid, thereby training the mammal to detect the powdered explosive-detection training aid.

Further areas of applicability of the packaging of the present disclosure will become apparent from the detailed description and examples provided hereinafter. It should be understood that the detailed description and specific examples, while providing specific embodiments of the disclosure, are intended for illustration only and should in no way limit the scope of the disclosure.

BRIEF DESCRIPTION OF THE DRAWINGS

An appreciation of the disclosure and many of the attendant advantages thereof may be understood by reference to the accompanying drawings. Included in the drawings are the following figures.

FIGS. 5A-5C depict embodiments of the present packaging material and show the selective permeability of the packaging material.

DETAILED DESCRIPTION

Figure 1:
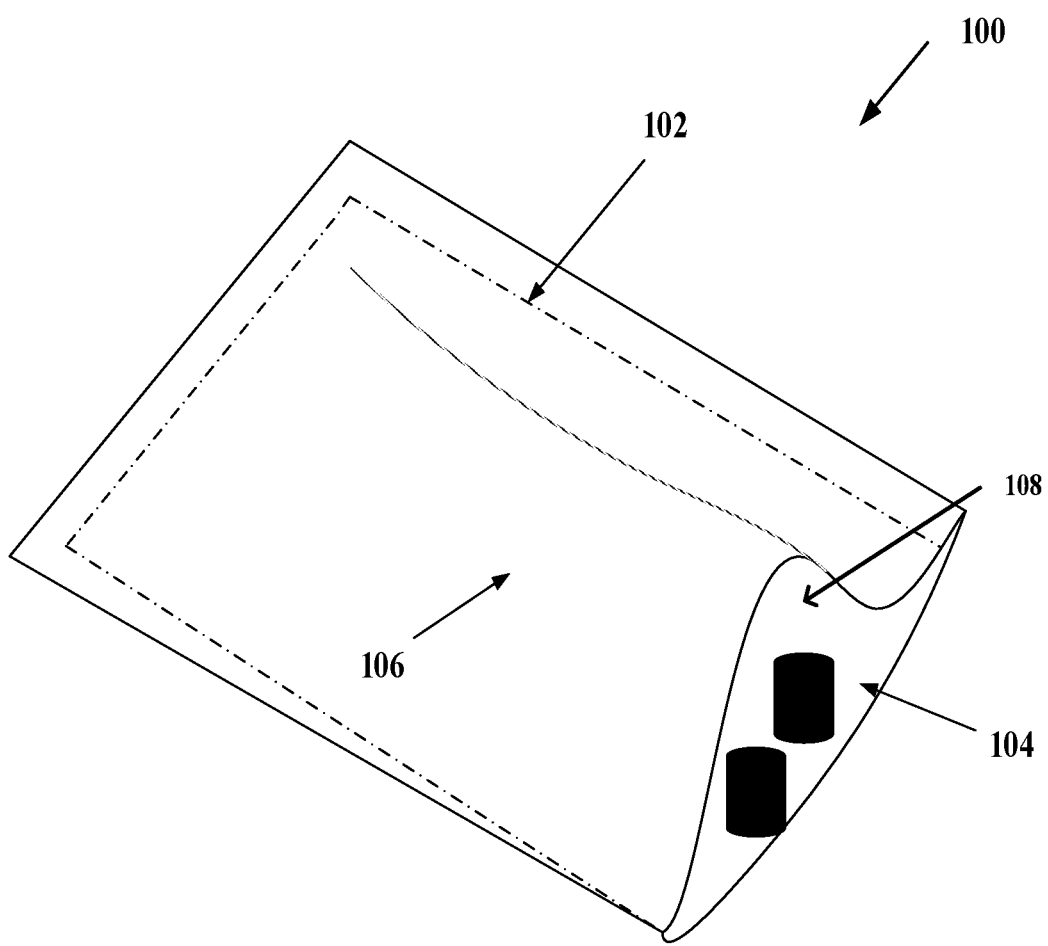
FIG. 1 depicts an embodiment of the packaging of the present disclosure as described in the detailed description.
Figure 2A:
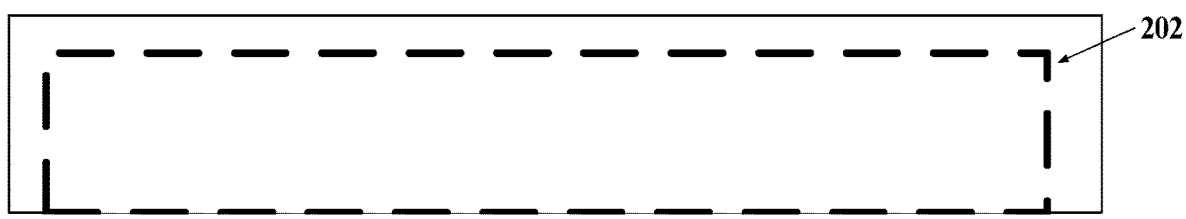
FIGS. 2A-2D depict different shapes of the present packaging, i.e., a rectangle (FIG. 2A), a triangle (FIG. 2B), a hexagon (FIG. 2C) and a pistol-type formation (FIG. 2D).
Figure 2B:
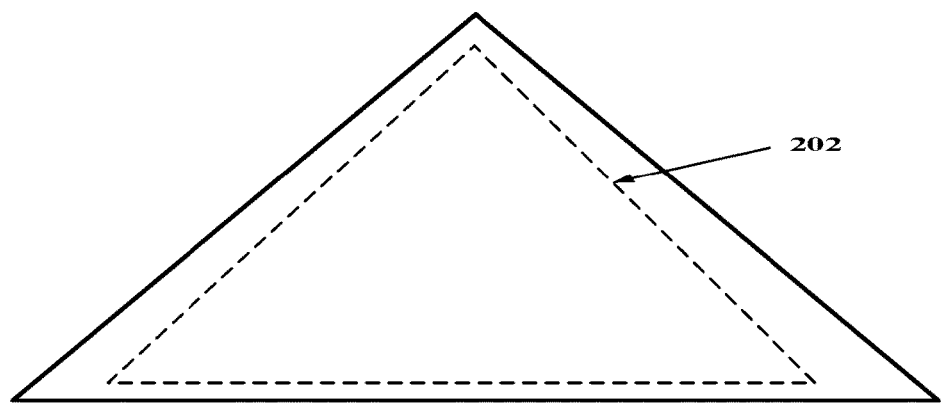
Figure 2C:
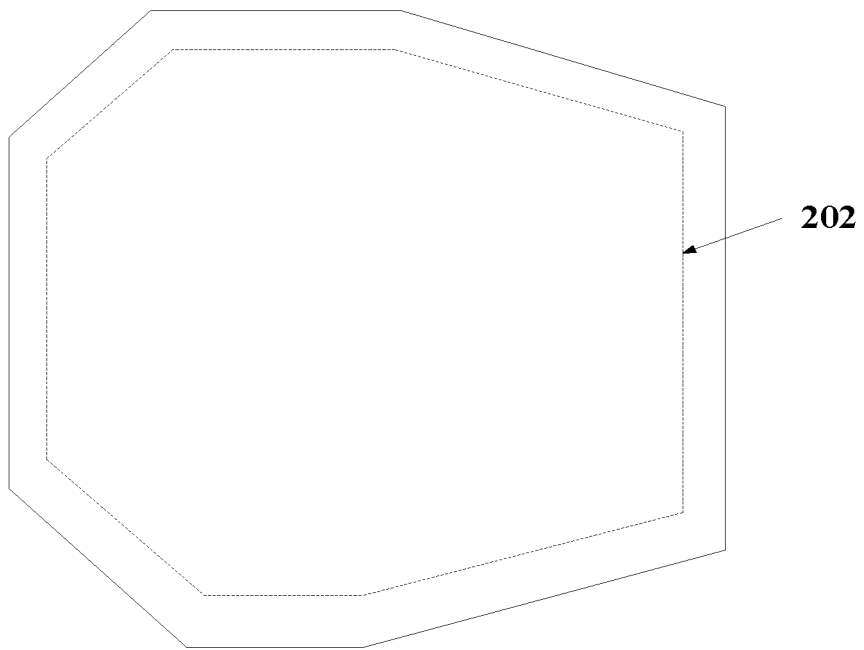
Figure 2D:
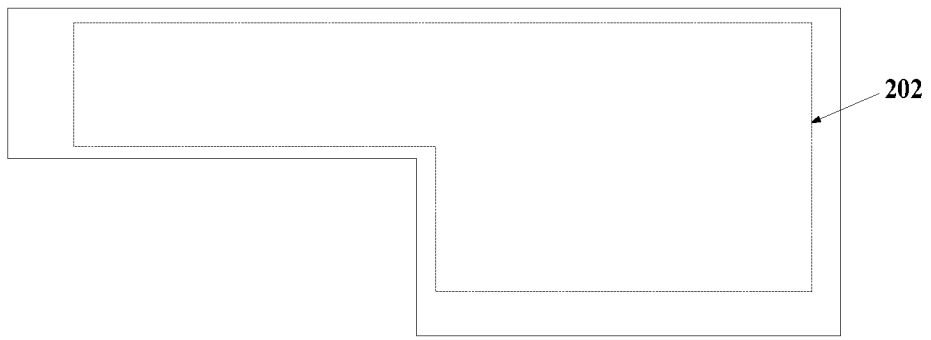

The present disclosure is directed to a packaging for a powdered explosive-detection training aid as described herein. Referring now to the drawings, FIG. 1 depicts a packaging 100 for a powdered explosive-detection training aid according to the present disclosure. The packaging includes first 104 and second 106 opposing flexible sheets. In some embodiments, the first 104 and second 106 opposing flexible sheets are heat sealed together along less than a periphery thereof 102. An unsealed portion of the periphery defines an opening 108 to a storage compartment.

In some embodiments, at least a portion of the first opposing flexible sheet 104 is a semipermeable material as described herein. For example, the entire first opposing flexible sheet 104 may be a semipermeable material. In other embodiments, at least 10%, such as at least 25%, such as at least 50% or such as at least 75% of the first opposing flexible sheet 104 is made from the semipermeable material.

As used herein the terms "semipermeable" or "selectively permeable" refer to a material that is permeable to a vapor emitted from a powdered explosive-detection training aid, but impermeable to particulate matter from the powdered explosive-detection training aid. In some embodiments, the semipermeable material is impermeable to liquid water, but permeable to water vapor. In some embodiments, the semipermeable material is impermeable to bacteria.

In some embodiments, the semipermeable material is spun-bonded polyolefin. The spun-bonded polyolefin may be prepared from high density polyethylene. Typically, the semipermeable material contains pores less than 1 micron in diameter, such as about 0.3 microns or less in diameter, such as about 0.22 microns in diameter. Semipermeable material suitable for use with the packaging of the present disclosure includes, for example, the commercially available TYVEK® (E. I. du Pont de Nemours and Company ("DuPont"), Wilmington, Del.), such as TYVEK® 1059B or TYVEK® 1073B.

In some embodiments, the second opposing flexible sheet 106 is a polymer film, such as a high density (e.g., 930 to 970 kilograms/meter$^3$) polyethylene (HDPE) film. In some embodiments, HDPE is prepared from a high molecular weight resin, such as a commercially available HD960 from Huntsman Packaging Corp. (South Deerfield, Mass.) or ALATHON® L5005 from Fina Oil and Chemical Co. (Deer Park, Tex.).

Examples of high molecular weight, high density polyethylene include the commercially available PRECISION CLEAN™ HD (Fisher Container Holdings LLP, Buffalo Grove, Ill.). This HDPE film comes in a variety of gauges, but typically a thickness of about 3 millimeters is used with the present packaging. In some embodiments the material of the second opposing flexible sheet is impermeable to vapor particles including those from powdered explosive-detection training aids and water. In some embodiments, the material of the second opposing flexible sheet is impermeable to water in a liquid phase.

In some embodiments, the first opposing flexible sheet 104 has substantially the same melting point as the second opposing flexible sheet 106. As used herein "substantially the same melting point" refers to a difference in melting points between, for example, the first 104 and second 106 opposing flexible sheets, which is no more than about 15° C., such as no more than about 10° C., such as no more than about 8° C., such as no more than about 6° C., such as no more than about 2° C. or such as no more than about 1° C.

In some embodiments, the first 104 and second 106 opposing flexible sheets are heat sealed together around less than an entirety of the periphery thereof. In the heat sealing process, the two opposing flexible sheets 104 and 106, for example, are heat sealed around less than the periphery using, e.g., a heat-sealing machine, such as a standard commercially available "twin seal" machine from Amplas, Inc. (Green Bay, Wis.). In some embodiments, heat and pressure are applied to each of the opposing flexible sheets, e.g., 20-40 psi. In some embodiments, the opening 108 may also be heat sealed to close the packaging after placing a powdered explosive-detection training aid into the packaging. Accordingly, in some embodiments the first and second opposing flexible sheets 104 and 106 are heat sealed around the entirety of the periphery thereof.

FIGS. 2A-2D depict various embodiments of the present packaging. As indicated in FIGS. 2A-2D, the present packaging may be of a variety of dimensions and varying seal widths. For example, FIGS. 2A-2D depict packaging in the form of a rectangle FIG. 2A, a triangle FIG. 2B, a hexagon FIG. 2C, or a pistol form FIG. 2D. In these embodiments, an opening, such as the opening 108 depicted is FIG. 1 is heat sealed after, e.g., placing a powdered explosive-detection training aid into the packaging. Accordingly, in these embodiments the seal 202 surrounds the entire periphery of the packaging.

In some embodiments, the bags are between 3 and 60 inches wide and 3 and 60 inches long, depending on need. The seals can vary in width between ⅛ inch and ¾ inch. Commonly, the present packages have a seal width of ⅛ inch.

Figure 3:
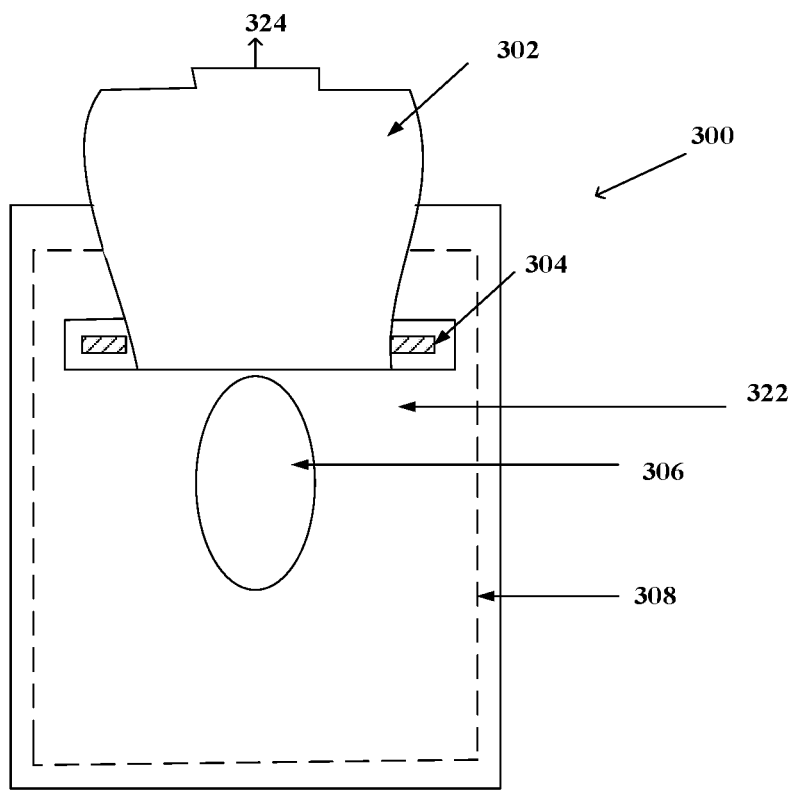
FIG. 3 depicts an embodiment of the packaging of the present disclosure, which includes a sealing member in an open position, as described in the detailed description.

FIG. 3 depicts an embodiment of a packaging 300, wherein only a portion 306 of the first opposing flexible sheet 322 is a semipermeable material. In some embodiments, the portion of the first opposing flexible sheet 322, which is not a semipermeable material, may be made of the same material as the second opposing flexible sheet (not shown), e.g., HDPE as described herein. FIG. 3 further shows a heat seal 308 around the periphery of the first 322 and second (not shown) opposing flexible sheets, a sealing member 302 comprising a tab 324 and an attachment member 304.

The sealing member 302, depicted here in the open position, may be secured to the first opposing flexible sheet 322 via the attachment member 304. Sealing member 302 may cover the entirety of the semipermeable portion 306 of the first opposing flexible sheet 322. In some embodiments, the tab 324 may be used to readily close sealing member 302. Typically, the sealing member 302 and optionally the tab 324 is/are in sealing contact with a vapor impermeable portion of the first opposing flexible sheet 322.

In some embodiments, the sealing member 302, tab 324 and/or the attachment member 304 comprise a butyl rubber.

Butyl rubber is a synthetic rubber, a copolymer of isobutylene with isoprene. Butyl rubber is produced by polymerization of about 98% of isobutylene with about 2% isoprene. Typically, butyl rubber is gas and moisture impermeable and resistant to heat, aging and weather.

In some embodiments, the sealing member 302, tab 324 and/or the attachment member 304 is/are attached to a first opposing flexible sheet 322 with a pressure sensitive-adhesive. As used herein "pressure-sensitive adhesives" refer to a category of adhesive that, in dry form, are permanently tacky at room temperature. Pressure-sensitive adhesives can adhere to a variety of substrates when applied with pressure; do not require activation by water, heat, or solvents; and generally have sufficient cohesive strength to be handled with the fingers. Examples of suitable pressure-sensitive adhesives for use with the present packaging include rubber based adhesives, acrylic adhesive and silicone adhesives.

In some embodiments, rubber-based pressure sensitive adhesives are used to attach the sealing member 302, tab 324 and/or attachment member 304 to the first opposing flexible sheet 322. In some embodiments, rubber-based pressure sensitive adhesives are synthetic, nonlatex rubbers (styrene block copolymers) formulated with tackifying resins, oils, and antioxidants. These pressure-sensitive adhesives provide good to excellent initial tack and adhesion along with excellent adhesion to materials such as that of the first opposing flexible sheet 322. In some embodiments, rubber based adhesives do not demonstrate good temperature resistance (typically <150° F.) or resistance to environmental stresses such as sterilization ultraviolet rays.

In some embodiments, the present packaging is not autoclavable or sterilizable. In other embodiments, the present packaging is autoclavable or sterilizable.

Figure 4:
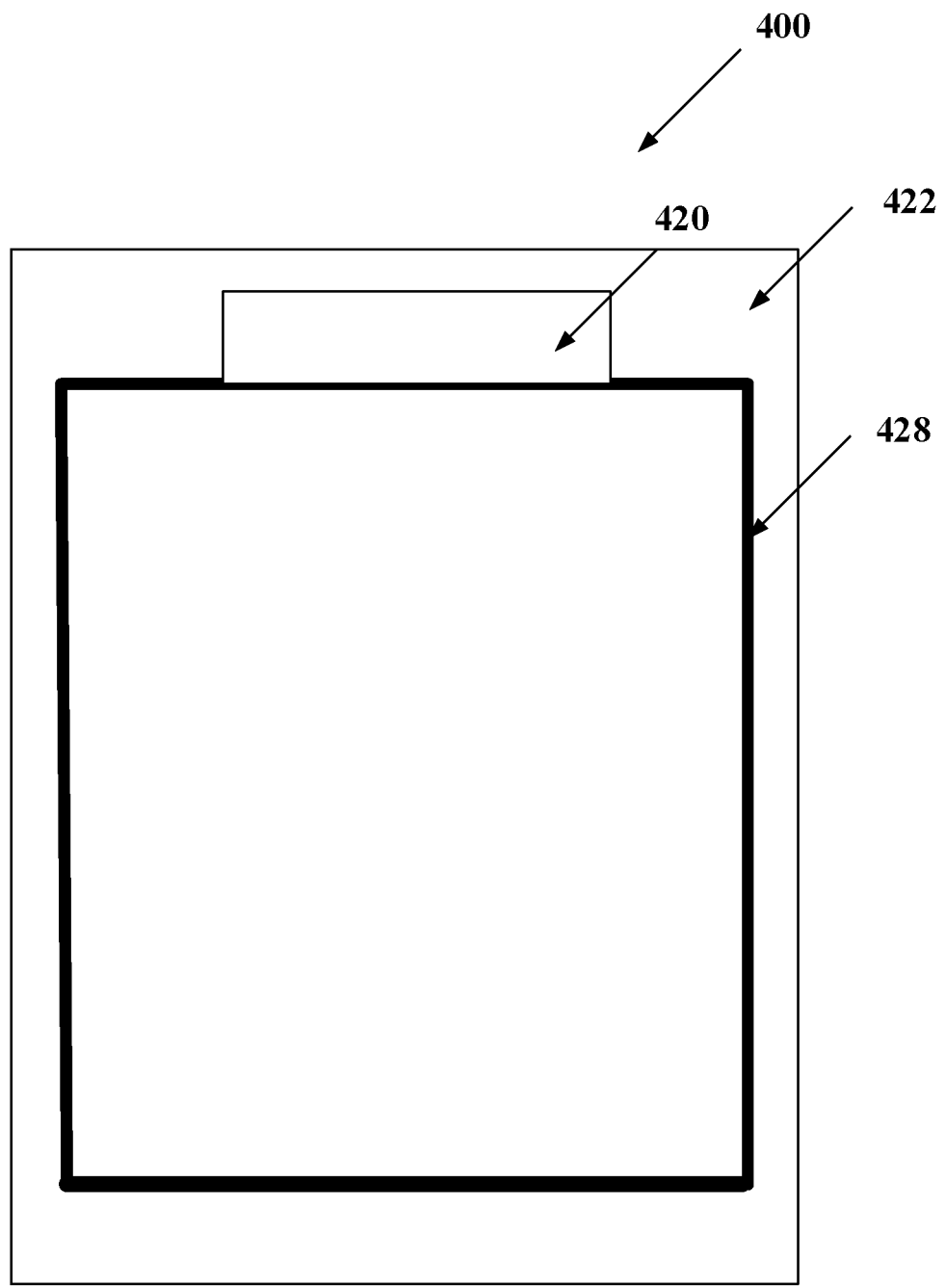
FIG. 4 depicts an embodiment of the packaging of the present disclosure, which includes a sealing member in a closed position, as described in the detailed description.

FIG. 4 depicts an implementation 400 of the present packaging showing a sealing member 428 that is secured to a portion of a first 422 opposing flexible sheet in a closing position. The sealing member includes a tab 420. Typically, the sealing member 428 has dimensions greater than that of the semipermeable portion (not shown) of the first opposing flexible sheet 422 and is in sealing contact with the vapor impermeable portion of the first opposing flexible sheet 422.

FIGS. 5A-5C depicts a packaging embodiment 500 showing how vapor particles from a powdered explosive-detection training aid pass through a semipermeable material of the present packaging material. FIG. 5A is a schematic of a first opposing flexible sheet 514, a second opposing flexible sheet 516, a storage compartment 510 and a semipermeable portion 506 of a first opposing flexible sheet 514. An implementation of a powdered explosive-detection training aid comprising explosive particulates 504 and explosive vapor particles 502 is also depicted.

FIG. 5B depicts a heat sealed storage compartment 510 containing particulate explosives 504 and explosive vapor particles 502. Although the storage compartment 510 is sealed, the semipermeable portion 506 of the first opposing flexible sheet 514 allows the explosive vapor particles to exit the packaging 500. The particulate explosives 504 are too large to exit the pores of the semipermeable material 506.

FIG. 5C depicts an implementation 500 of the present packaging with a sealing member 556 in the closed position. In these embodiments, neither the particulate explosives 504 nor the explosive vapor particles 502 are able to exit the pores of the semipermeable material 506 of the first opposing flexible sheet 514.

In another aspect, the present disclosure is directed to a packaged powdered explosive-detection training aid comprising the packaging according to the present disclosure, wherein the packaging contains a powdered explosive-detection training aid in the storage compartment.

As used herein, the term "powdered explosive-detection training aid" encompasses genuine explosives in powdered form and non-hazardous explosives that may be used for security training, also known as pseudo-explosives. Examples of pseudo-explosives include impurities and/or degradation products of genuine explosives. Typical examples of pseudo-explosives include 2,4-dinitrotoluene, 2,6-dinitrotoluene, terpenes, cyclohexanone, 2-ethyl-1-hexanol, diphenylamine, dimethyldinitrobutane and ethyl centralite and combinations thereof.

In some embodiments, the powdered explosive-detection training aid is selected from ammonium nitrate, double based smokeless powder, hexamethylene triperoxide diamine, single based smokeless powder, RDX-based plastic explosives (e.g., Composition C-4), triacetone triperoxide, and combinations thereof. In other embodiments, the powdered explosive-detection training aid is a hydrophilic powdered explosive-detection training aid. Typical examples of hydrophilic powdered explosive-detection training aids include ammonium nitrate prills, ammonium nitrate/fuel oil, urea nitrate, potassium chlorate, potassium perchlorate, tetryl, trinitrotoluene, and combinations thereof. The packaged powdered explosive-detection training aid of the present disclosure may include any of the powdered explosive-detection training aids described herein, such as the hydrophilic powdered explosive-detection training aids.

In some embodiments, the packaging of the present disclosure containing a powdered explosive-detection training aid is heat sealed around the periphery. The present packaged powdered explosive-detection training aid, further, typically contains a sealing member as described herein, which is in a closed position. In some embodiments, the sealing member covers the semipermeable portion of the first opposing flexible sheet as herein described, which prevents vapor plumes, including vapor plumes from the powdered explosive-detection training aid, from escaping the instant packaging. The packaged powdered explosive-detection training aid may be stored until use, such as for a day, a week, three or more months or up to one year.

Methods

In another aspect, the present disclosure is directed to a method of training an animal to detect a powdered explosive-detection training aid. In some embodiments, the animal is a mammal. Typically, the mammal is a domestic dog. However, in some embodiments, the mammal is a rodent, such as a rat or a mouse.

In some embodiments, a human trainer inserts samples of a powdered explosive-detection training aid as described herein into an opening of a storage compartment of the present packaging. The amount of powdered explosive-detection training aid inserted into the present packaging may be in any amount, such as from 1 gram to 900 grams, such as about 115 grams or 50 grams.

Typically, after placing the powdered explosive-detection training aid into the present packaging, the opening of the package as described herein is closed by heat sealing, as also herein described. In some embodiments, a sealing member is placed into the closed position as described herein, thus preventing the vapor particles from the powdered explosive-detection training aid from permeating through the packaging.

In some embodiments, the packaged powdered explosive-detection training aid is placed into a training area, e.g., within an airplane. In some embodiments, the sealing member is placed into the open position or removed, thus allowing the vapor particles from the powdered explosive-detection training aid to escape from the packaging. The animal, such as a mammal, may then be conditioned to detect the vapors permeating from the packaged powdered explosive-detection training aid.

Conditioning of the animal may be accomplished by e.g., rewarding the animal, such as a mammal, with food or a toy when the animal displays a response at the location of the packaged powdered explosive-detection training aid. For example, a mammal, such as a dog, may be walked to a training area on a leash by a human trainer. The leash may then be removed from the e.g., dog, and a command given to search. During the search, the trainers may avoid eye contact with the animal and maintain a neutral body position in order to minimize unintentional cueing. Upon displaying a response at the packaging location, such as about one meter from the actual packaging location, an additional trainer outside of the training area and out of view of the e.g., dog, may toss a reward into the training area the moment a correct response is exhibited. Upon a negative response, the e.g., dog, may be removed from the training area with no reward. Such conditioning may be repeated.

Embodiments of the present disclosure are further described in the following examples. The examples are merely illustrative and do not in any way limit the scope of the disclosure as described and claimed.

EXAMPLES

Example 1

Packaging

A packaging according to the present application comprising a first opposing flexible sheet prepared from 1059B or 1073 TYVEK® and a second opposing flexible sheet prepared from PRECISION CLEAN™ HD film (6 inches by 12 inches, 0.003 inches thick) was manufactured. The first and second opposing flexible sheets were heat sealed around less than a periphery thereof, leaving an opening to a storage compartment that was formed between the opposing flexible sheets. The packaging was in the form of a bag. The bag repelled water indicating its suitability for use with hydrophilic powdered explosive-detection training aids. The bag was assessed to determine whether or not the powdered explosive-detection training aids could permeate the bag as described below.

Example 2

Military TNT and Flake TNT

Materials and Methods

Military TNT and Flake TNT were used to test the permeability of the packaging described in Example 1. Military TNT differs from conventional industrial explosives in that military TNT has significantly higher explosive characteristics than those of conventional industrial explosives. For example, military TNT is capable of splitting strong armor due to its high explosive fragmentation. Flake TNT may refer to genuine TNT in a flaked form instead of, e.g., a powdered or cast solid formed TNT. Flake TNT may also refer to an inert simulant in a flaked form. The Flake TNT used in this example matches the density of real TNT, but is inert.

Military TNT pellets were obtained from a military TNT stick. Flake TNT was obtained from the Transportation Security Laboratory (Egg Harbor Township, N.J.). The military TNT pellets (113.4 grams) and the Flake TNT (50 grams) were each added to a separate bag, manufactured as described in Example 1, and sealed with a heat sealer to close the opening to the storage compartment. In addition, 113.4 grams military TNT pellets and 50 grams Flake TNT, were each added to a separate beaker. Each of the foregoing beakers and bags were placed into individual headspace glass vessels and stored overnight. Vapor samples from the headspace glass vessels were collected into thermal desorption tubes and analyzed on a Thermal Desorption Unit-Triple Quad-gas chromatography/mass spectrometry instrument.

Table 1 shows the amount of vapor detected from the permeable bags and beakers (five replica of flake and military TNT). The average vapor concentration of the military TNT, which was placed into a permeable bag, was 65 nanograms/liter (ng/L), while the average vapor concentration of military TNT in a beaker was 97 ng/L, indicating that the present packaging was permeable to at least some military TNT.

The average vapor concentration of the flake TNT, which was placed into a permeable bag, was 91 ng/L, while the average vapor concentration of flake TNT in a beaker was 81 ng/L, indicating that the present packaging is permeable to flake TNT. Further, the instant packaging was found to be more permeable to flake TNT than military TNT (91 ng/L versus 65 ng/L). This result occurred even though the amount of the military TNT pellets contained with the packaging was more than double that of the flake TNT (113.4 grams versus 50 grams).

Without being limited by theory, it is believed that the increase in TNT vapor from the Flake TNT in a permeable bag in comparison to that of the military TNT in a permeable bag may be due to the greater exposed surface area of the Flake TNT. That is, the flake formation is recognized as having a greater exposed surface area than that of the military TNT, which is cast in a solid pellet form. Moreover, the larger amount of Flake TNT vapor observed in the headspace from the Flake TNT in the permeable bag in comparison to that of the Flake TNT in the beaker is likely because the surface area of the exposed Flake TNT in the beaker is limited to the size of the beaker. In contrast, the surface area of the exposed Flake TNT in the permeable bag is only limited by the size of the bag area exposed to the Flake TNT. Thus, even larger permeable bags should allow a greater portion of Flake TNT surface area to be exposed, resulting in even greater vapor release.

TABLE 1

Permeability of Military and Flake TNT
MILITARY TNT AND FLAKE TNT

| Trial | TNT in permeable packaging | Concentration ng/L | TNT in beaker | Concentration ng/L | Flake TNT in permeable bag | Concentration ng/L | Flake in beaker | Concentration ng/L |
|---|---|---|---|---|---|---|---|---|
| 1 | 4720 | 65.7 | 7530 | 104.8 | 6619.0 | 92.2 | 5582 | 77.7 |
| 2 | 4697 | 65.4 | outlier |  | outlier |  | 5318 | 74.0 |
| 3 | 4320 | 60.2 | 6147 | 85.6 | 6646.0 | 92.5 | 6112 | 85.1 |
| 4 | 4599 | 64.0 | 5921 | 82.4 | 6460.0 | 89.9 | 6294 | 87.6 |
| 5 | 4926 | 68.6 | 8324 | 115.9 | 6482.0 | 90.3 | outlier |  |
| AVG | 4652 | 64.8 | 6981 | 97.2 | 6551.8 | 91.2 | 5827 | 81.1 |
| STDV | 221 | 3 | 1144 | 16 | 94 | 1 | 454 | 6 |

Military TNT (1/4 lb = 113.4 grams)
Flake TNT (50 grams)
Chamber Temp @25 ± 0.5° C.

Figure 6:
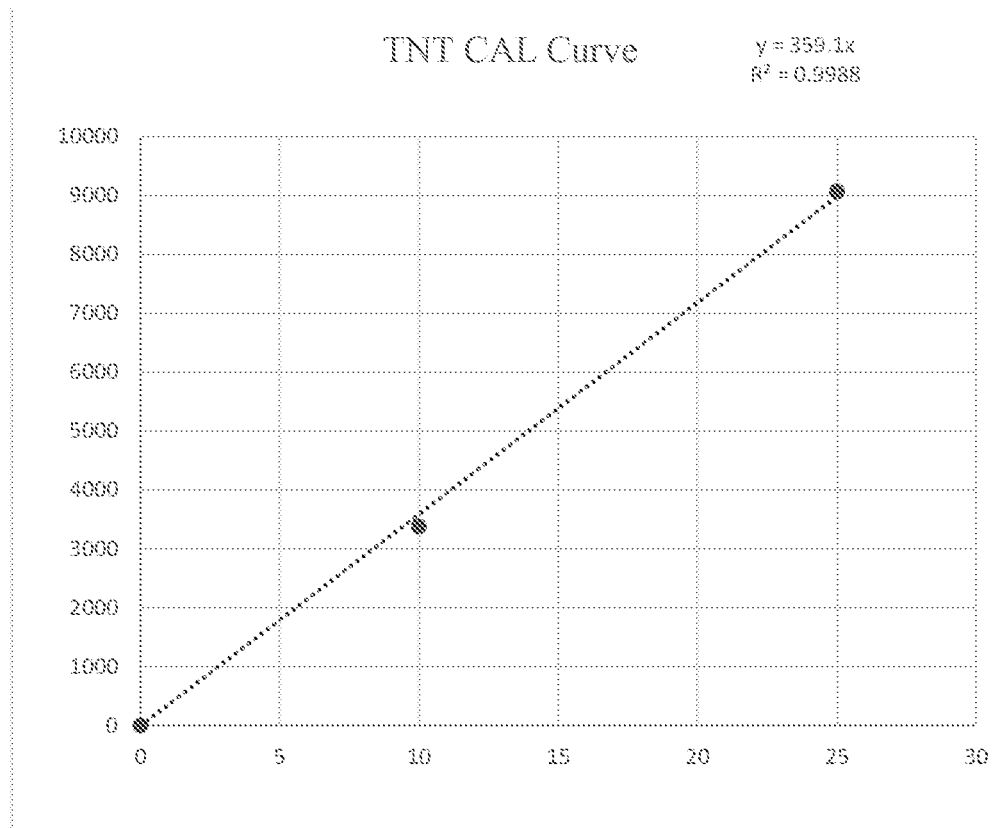
FIG. 6 depicts a calibration curve for trinitrotoluene as described in the Examples.
Figure 7:
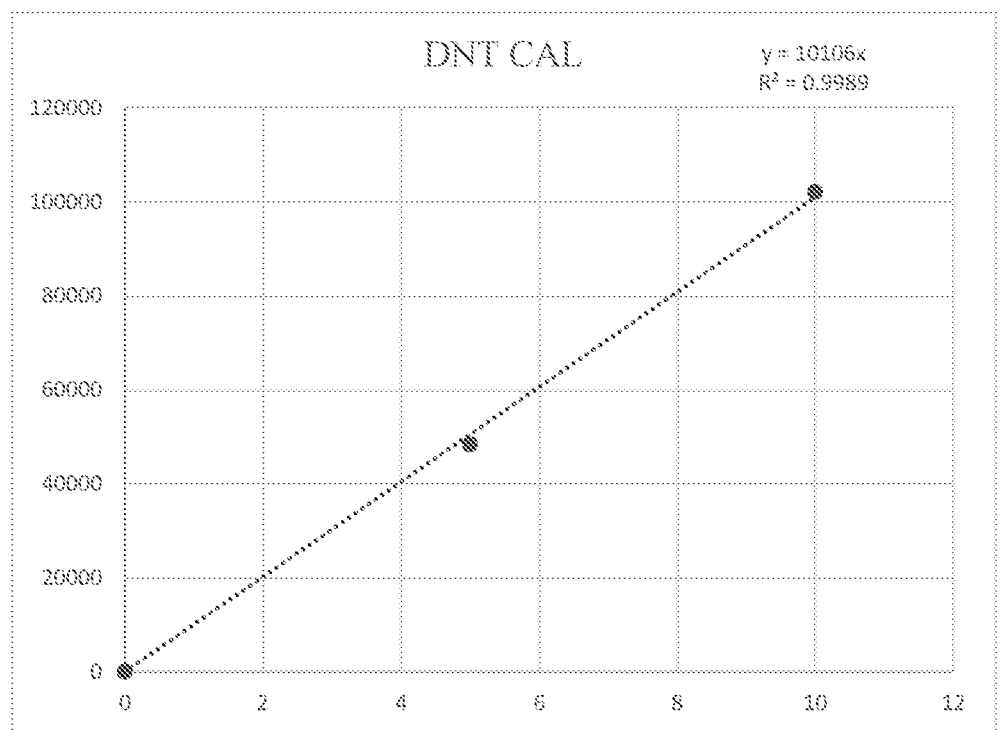
FIG. 7 depicts a calibration curve for dinitrotoluene as described in the Examples.

Known standards, DNT and TNT (AccuStandard, Inc., New Haven, Conn.) were injected into a Liquid Injection Vapor Generator. The vapor samples were collected into thermal desorption tubes and analyzed on a Thermal Desorption Unit-Triple Quad-gas chromatography/mass spectrometry instrument. Calibration curves for DNT and TNT are shown in FIGS. 6 and 7, respectively.

Table 2 presents the vapor concentration of the DNT standard (vapor pressure of $1.47 \times 10^4$ Torr at 22° C.). and the TNT standard (vapor of $5.8 \times 10^{-6}$ Torr at 25° C.). in each of the military and Flake TNT samples described above. As indicated in Table 2, the headspace was filled with more DNT vapor molecules than TNT vapor molecules. Accordingly, the results indicate that the packaging according to the present disclosure appears to more permeable to compounds characterized by higher vapor pressures.

TABLE 2

Permeability of DNT and TNT

|  | Compound | Peak A. | % Ratio | Concentration (ng/L) |
|---|---|---|---|---|
| Military TNT | DNT | 6297654 | 98 | 3116 |
| (Bare, 113.4 grams) | TNT | 140077 | 2 |  |
| Flake TNT | DNT | 8441396 | 98 | 4176 |
| (50 grams) | TNT | 142855 | 2 |  |

Example 3

Permeability of Potassium Chlorate 226 grams Potassium chlorate (226 grams) were added to a packaging as described above in Example 1. Potassium chlorate (226 grams) was also added to a beaker. The packaging was sealed with a heat sealer to close the opening to the storage compartment. The beaker and packaging were placed into two different headspace glass vessels and stored overnight. The headspace samples were collected into a glass-bead packed tube. The tube was positioned in the sampling port of the headspace glass vessel and cooled to −150° C. in a cryogenic device. The samples were then extracted in deionized water and solute was collected from each tube. The solution was analyzed on a Liquid Chromatography-Time-of-Flight Mass Spectrometry instrument.

The mass spectrometry results revealed the presence of chlorine ions, an indicator of potassium chlorate, in the headspace sample. Accordingly, the packaging of the instant disclosure is also permeable to vapor containing potassium chlorate.

Example 4

Permeability of Triacetone Triperoxide

Non-detonable triacetone triperoxide (50 milligrams, 5% TATP and 95% diatomaceous earth) was placed into a tin container, which was then placed into a permeable bag. The bag was then sealed with a heat sealer and stored in a headspace glass vessel overnight. A second tin container containing triacetone triperoxide was also stored in a headspace glass vessel. Each headspace sample was collected into a thermal desorption tube at room temperature. The thermal desorption tube was analyzed on a Thermal desorption System-Gas Chromatography/Mass Spectrometry instrument.

Figure 8:
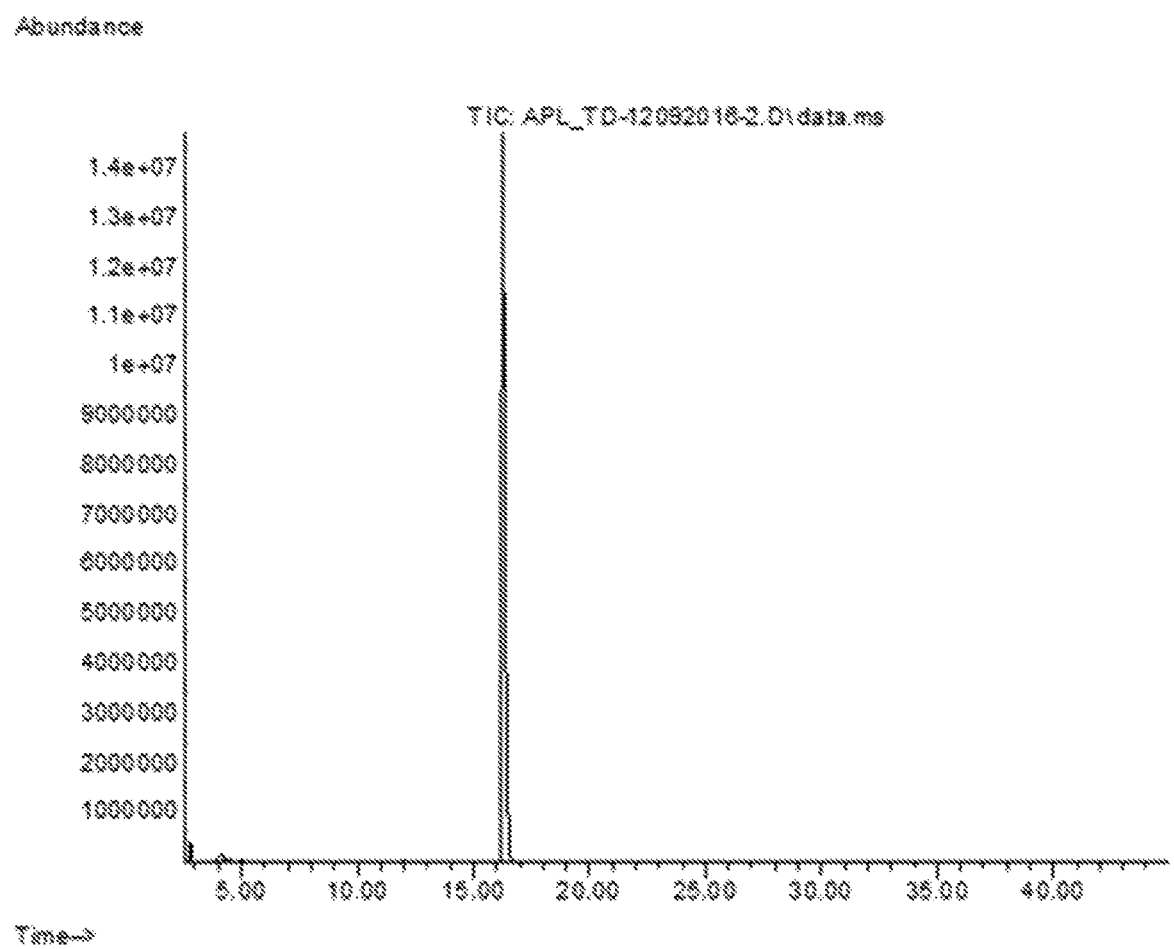
FIG. 8 depicts a chromatogram showing that triacetone triperoxide permeated from a packaging of the present disclosure as evidenced from a headspace glass vessel sample as described in the Examples.
Figure 9:
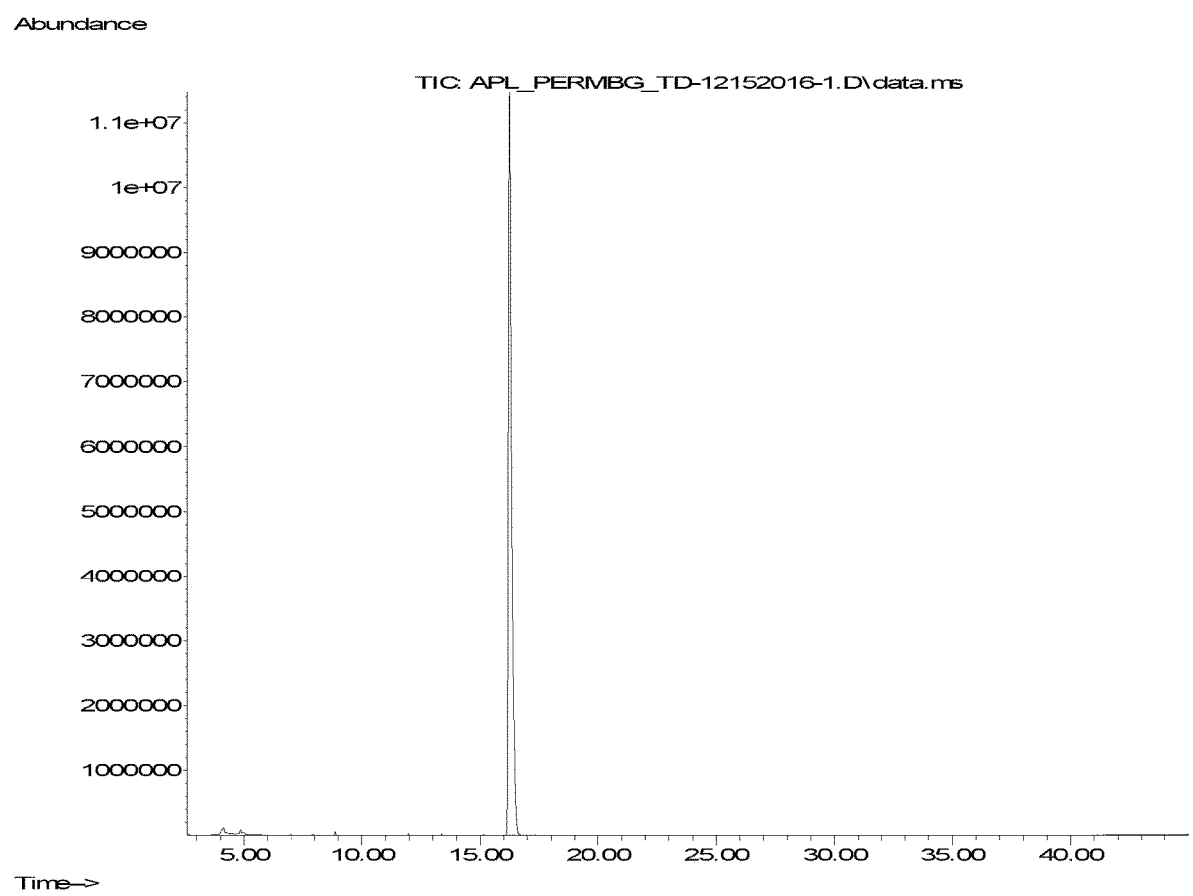
FIG. 9 depicts a chromatogram showing the presence of triacetone triperoxide in a headspace glass vessel as described in the Examples.

FIG. 8 shows that non-detonable triacetone triperoxide sample (in a tin container) entered the headspace. FIG. 9 also shows that non-detonable triacetone triperoxide in a tin container and the present packaging entered into the headspace. Accordingly, the packaging of the present disclosure is also permeable to triacetone triperoxide.

Reference through the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

I claim:

1. A packaging for a powdered explosive-detection training aid comprising:
    first and second opposing flexible sheets,
        wherein the first and second opposing flexible sheets are heat sealed together along less than a periphery thereof and define a storage compartment therebetween,
        wherein an unsealed portion of the periphery defines an opening to the storage compartment,
    wherein a melting point of the first opposing flexible sheet is substantially the same as a melting point of the second opposing flexible sheet, wherein at least a portion of the first opposing flexible sheet is a semipermeable material,
wherein the semipermeable material is permeable to a vapor emitted from the powdered explosive-detection training aid, and
wherein the semipermeable material is impermeable to liquid water and particulate matter from the powdered explosive-detection training aid,
wherein the second opposing flexible sheet is impermeable to the powdered explosive-detection training aid vapor; and
a sealing member, wherein the sealing member is secured to the first opposing flexible sheet and, in a closing position, covers the semipermeable portion of the first opposing flexible sheet.

2. The packaging of claim 1,
wherein at least a portion of the first opposing flexible sheet is impermeable to the powdered explosive-detection training aid vapor; and
wherein, in the closing position, the sealing member is in sealing contact with the vapor impermeable portion of the first opposing flexible sheet.

3. The packaging of claim 2,
wherein the vapor permeable portion of the first opposing flexible sheet is a spun-bonded polyethylene; and
wherein the vapor impermeable portion of the first opposing flexible sheet is a high density polyethylene film.

4. The packaging of claim 1, wherein the second opposing flexible sheet is a high density polyethylene film.

5. The packaging of claim 1, wherein the sealing member is secured with a pressure sensitive adhesive comprising a rubber based adhesive.

6. The packaging of claim 1, wherein the sealing member comprises a butyl rubber.

7. A packaged powdered explosive-detection training aid comprising:
first and second opposing flexible sheets with a powdered explosive-detection training aid therebetween, the opposing flexible sheets being heat sealed along a periphery thereof,
wherein a melting point of the first opposing flexible sheet is substantially the same as a melting point of the second opposing flexible sheet,
wherein at least a portion of the first opposing flexible sheet is a semipermeable material,
wherein the semipermeable material is permeable to a vapor emitted from the powdered explosive-detection training aid,
wherein the semipermeable material is impermeable to liquid water and particulate matter from the powdered explosive-detection training aid,
wherein the second opposing flexible sheet is impermeable to the powdered explosive-detection training aid vapor; and
a sealing member, wherein the sealing member is secured to the first opposing flexible sheet and, in a closing position, covers the semipermeable portion of the first opposing flexible sheet.

8. The packaged powdered explosive-detection training aid of claim 7, wherein the vapor permeable portion of the first opposing flexible sheet is a spun-bonded polyethylene.

9. The packaged powdered explosive-detection training aid of claim 7, wherein the second opposing flexible sheet is a high density polyethylene film.

10. The packaged powdered explosive-detection training aid claim 7, wherein the sealing member is secured with a pressure sensitive adhesive comprising a rubber based adhesive.

11. The packaged powdered explosive-detection training aid of claim 7, wherein the powdered explosive-detection training aid is selected from the group consisting of ammonium nitrate, double based smokeless powder, hexamethylene triperoxide diamine, single based smokeless powder, triacetone triperoxide, and combinations thereof.

12. The packaged powdered explosive-detection training aid of claim 7, wherein the powdered explosive-detection training aid is a hydrophilic powdered explosive-detection training aid.

13. The packaged powdered explosive-detection training aid of claim 12, wherein the hydrophilic powdered explosive-detection training aid is selected from the group consisting of ammonium nitrate prills, ammonium nitrate/fuel oil, urea nitrate, potassium chlorate, potassium perchlorate, tetryl, trinitrotoluene, and combinations thereof.

* * * * *